United States Patent [19]

Fanciullo

[11] 4,060,669
[45] Nov. 29, 1977

[54] FLAT BATTERY

[75] Inventor: Ralph D. Fanciullo, Waltham, Mass.

[73] Assignee: Polaroid Corporation, Cambridge, Mass.

[21] Appl. No.: 612,210

[22] Filed: Sept. 10, 1975

[51] Int. Cl.² .............................................. H01M 6/46
[52] U.S. Cl. ................................... 429/152; 429/162; 429/185
[58] Field of Search ....................... 136/111, 131–133, 136/106–108; 429/152–162, 185

[56] References Cited

U.S. PATENT DOCUMENTS

| 3,784,414 | 1/1974 | Macaulay | 136/111 |
| 3,870,566 | 3/1975 | Bergum | 136/111 |
| 3,907,599 | 9/1975 | Fanciullo | 136/111 |

Primary Examiner—Charles F. LeFevour
Attorney, Agent, or Firm—John W. Ericson

[57] ABSTRACT

A thin battery of the LeClanche type incorporating a multiplicity of electrically conductive layers and sheet separators arranged to cooperate in conjunction with electrochemical material to form a multicell battery. Continuous frame-type sheet seals may be thermally bonded to the periphery of each of the separator and conductive layers to provide an insulative sealing arrangement. The frame components are sealed with the conductive layers only inboard of the external peripheries of the batteries to provide for the improved outgassing of cell generated gases.

13 Claims, 4 Drawing Figures

FLAT BATTERY

BACKGROUND

The development of highly automated cameras capable of being folded into a thin, compact shape suited for convenient carrying as described, for instance, in U.S. Pat. Nos. 3,750,551; 3,744,385; 3,731,608; and 3,714,879 has generated a corresponding requirement for a relatively inexpensive disposable battery power supply. To provide the somewhat specialized power requirements for the instrumentalities of the camera while at the same time maintaining requisite compactness, a flat, multicell primary battery is required which exhibits a low internal impedance to produce a relatively high current output for powering motor driven film processing and reflex optics, cocking assemblies along with shutter control features. During this powering activity, the battery is called upon to maintain perdetermined voltage levels required to operate integrated logic control circuits.

For purposes of consumer convenience as well as the maintenance of the requisite compactness of the camera system, as described in U.S. Pat. No. 3,543,662, the flat batteries preferably are pre-packaged within a film-laden cassette assembly and generally take the area dimensional configuration of one film unit therewithin. Accordingly, a disposable power supply is combined with a disposable film cassette thereby permitting requisite compactness and thinness of the resultant camera system while assuring a continuously replenished or fresh and active power supply.

To remain practical within the above-described camera system, the multicell flat batteries must be structured to exhibit an assured or reliable shelf life concomitant with their copackaged film unit. Such reliability is mandatory inasmuch as any dysfunctions on the part of the battery component of the cassette assemblage well may result in the wasting of an entire film package. When considered from the viewpoint of high volume manufacture and packaging, however, an inexpensively assembled flat laminar multicell battery format necessarily is somewhat delicate. For instance, the laminar, multicell pile structures are called upon to perform efficiently without resort to compressive packaging techniques and the like utilized in more conventional batteries. One technique for maintaining necessary laminar integrity looks to the utilization of polymeric adhesives and the like to adhere "patches" of electrode active material to electrically conductive polymeric collector sheet surfaces. As an example, U.S. Pat. No. 3,770,504 describes the predeposition of particulate electrode material upon a carbon impregnated polymeric current collector surface to form a "patch-type" electrode structure. Such assemblies subsequent to patch deposition are combined in combination with a gel electrolyte and sheet separator material to derive a multicell battery.

A flat battery structure from which enhanced current drain capacities are available is described in a copending application for U.S. Patent of S. A. Buckler, Ser. No. 495,681, now abandoned, filed Aug. 8, 1974, entitled "Flat Battery" and assigned in common herewith. This battery includes both positive and negative active components in an aqueous slurry form as particulate dispersions with electrolyte and hydrophillic polymeric binder or dispersant. The electrode particles within the slurry are present in a concentration per unit area which is effective to provide an electrically conductive dispersion and, in consequence of higher surface availability of electrode materials within the electrochemical system, batteries of a desirably broad range of current capacity are readily designed and manufactured. In another commonly assigned copending application for U.S. Patent, Ser. No. 495,628, now abandoned, filed Aug. 8, 1974 by E. H. Land, entitled "Flat Battery", a battery structure of an enhanced output capacity is described as incorporating a laminar cell structure having a planar cathode assembly including a current collector carrying on one surface, in order, a first cathode mix comprising a particulate dispersion of cathode mix particles in a binder matrix and a second cathode mix comprising a particulate dispersion of cathode mix particles with a hydrophillic binder disposed within aqueous electrolyte, i.e., in slurry form.

In addition to the necessity for maintaining the laminar integrity of the flat battery structures, the peripheral borders of their sheet-type electrochemically active components must both be sealed with a high degree of integrity and the electrically conductive components thereof must be protected from shorting effects and the like. Improved peripheral sealing techniques have been described, for instance, in a copending application for U.S. Pat. No. by R. Fancuillo et al, Ser. No. 536,379, filed Dec. 26, 1974, entitled "Flat Battery", now abandoned and assigned in common herewith. The peripheral seal discussed therein contemplates a continuous frame-type electrically insulative sheet sealing component selectively dimensioned to avoid edge shorting effects as well as to derive a rigid peripheral structure in the final battery composite.

Primary battery structures tend to generate gases or volatile effluvia in the course of electrochemical activity. Where such conditions are encountered within the laminar structures described above, delamination effects may occur resulting in increased internal impedance or total failure.

Accordingly, an effective accommodation for such phenomena will improve battery shelf life and performance. The techniques utilized, however, should provide for the removal of effluvia while blocking outer atmospheric influence and while maintaining required moisture levels of the electrolyte or slurries within the structure. Some venting techniques for flat batteries are described, for instance, in U.S. Patent No. 3,877,045 and copending application for U.S. Pat. by E. H. Land, entitled "Novel Battery", filed Oct. 3, 1973, Ser. No. 403,039, and now abandoned both assigned in common herewith.

The selection of component materials, their shapes, interrelational geometries and the techniques of their practical assembly has continued to require improvement. A succession of design alterations to structure, material or assembly may remain somewhat subtle, but also may combine to achieve needed performance.

SUMMARY

The present invention is addressed to a flat battery structure of improved reliability which exhibits advantageously lower swelling characteristics otherwise occasioned by the volatile effluvia generated by electrochemical activity. This feature is gained through a particular structuring of the sheet-type components of the resultant pile as well as a particular arrangement for intercoupling all of these components.

An object and feature of the invention is to provide a flat battery structure generally comprised of flat, sheet-type electrically conductive electrode supporting components which are arranged in laminar fashion in combination with electrode materials, interelectrode separators and electrolyte to define a series coupled grouping of electrochemical cells. Electrically insulative frames are utilized in forming seals about the peripheral faces of each of the electrode supporting components and, preferably, extend therefrom to provide an electrically insulative protective portion. When the framed components of the battery structure are compiled in registry, the border seal portions correspondingly will be superpositioned in registry, whereupon they are mutually thermally intersealed along a region inwardly disposed from their peripheries. As a consequence, a gas venting arrangement for each cell within the multicell pile structure is provided.

Another object and feature of the invention is to provide a flat or laminar battery of a type which utilizes carbon impregnated polymeric sheet electrode supports for electrode active material in combination with sheet separators and electrolytes to define a laminar pile structure. The electrode supports are mutually separated in electrically insulated fashion by the noted separators as well as a peripherally disposed seal component. Swelling due to gassing effects within the battery is reduced through an improved arrangement wherein the noted seal is formed between mutually adjacent electrode supports in a manner wherein a portion of the electrode supports remains exposed to the atmosphere. The arrangement may be provided by effecting the seal within a discrete region inboard of the outer periphery of the electrode supports. In a preferred embodiment, the seal component is present as a frame formed of polymeric sheet material which is compatible for thermal or heat sealing purposes with the electrode support material. By selecting the electrode support material as a carbon inpregnated polymeric sheet, appropriate venting can be achieved for each cell within the pile. Where the outer peripheral dimension of the noted frames are arranged to extend beyond the peripheries of corresponding electrode supports, adequate electrical isolation of the supports may be realized.

Other objects of the invention will in part be obvious and will in part appear hereinafter.

The invention accordingly comprises the product possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION

Figure 1:
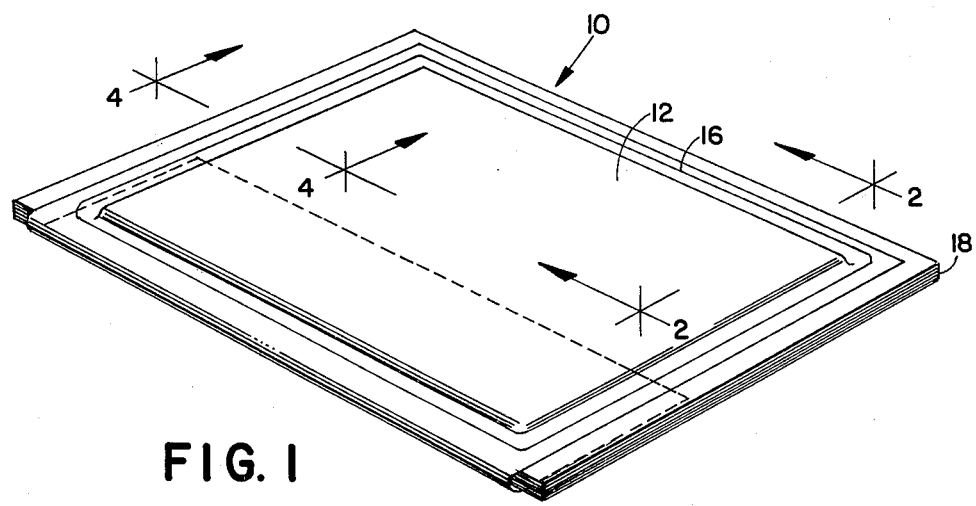
FIG. 1 is a perspective view of a flat primary battery structure according to the invention.

A multicell flat battery structure is presented generally at 10 in FIG. 1 as it would appear in an electrochemically active state following component buildup and prior to final packaging. Features of the battery structure apparent from this perspective view include an upwardly disposed anode electrode current collector assembly 12, the outwardly facing surface 14 of which is fashioned of metal to provide a terminal defining surface. Current collector assembly 12 is folded about one side of battery structure 10 such that its terminal defining surface portion is located on the lower side of the battery in adjacency with a terminal surface of opposite polarity. The slight depression 16 inwardly disposed from the periphery of the assembly is occasioned from sealing procedures provided, in accordance with the invention, during a step of assembly. This depression is exaggerated in the sectional views of the battery to provide a more clear portrayal. Note that a laminar array 18 of the peripheral edges of sheet components within the battery may be observed extending outwardly from depression 16.

Figure 2:
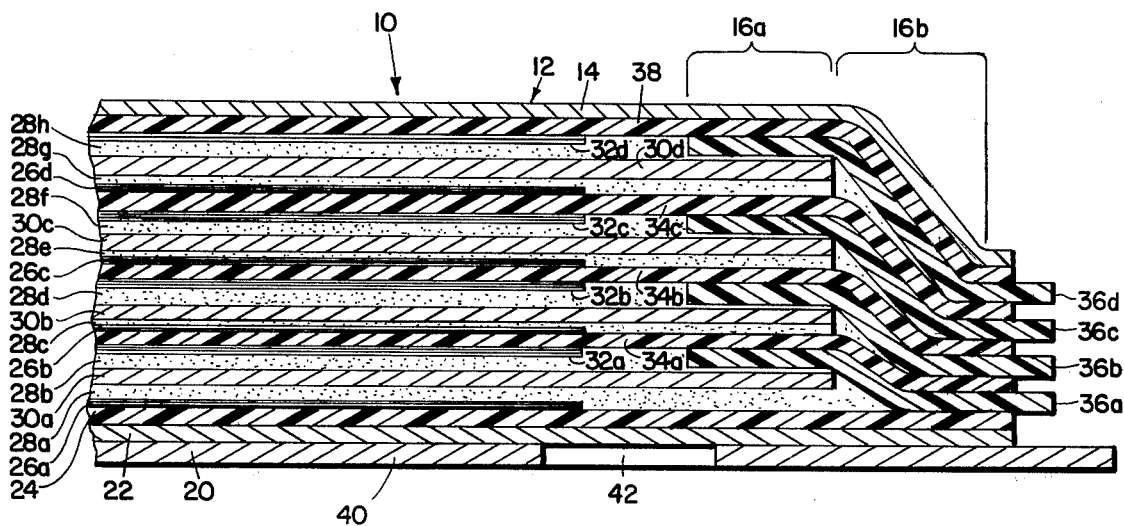
FIG. 2 is a sectional view of a battery structure according to the invention taken through the plane 2—2 of FIG. 1.
Figure 3:
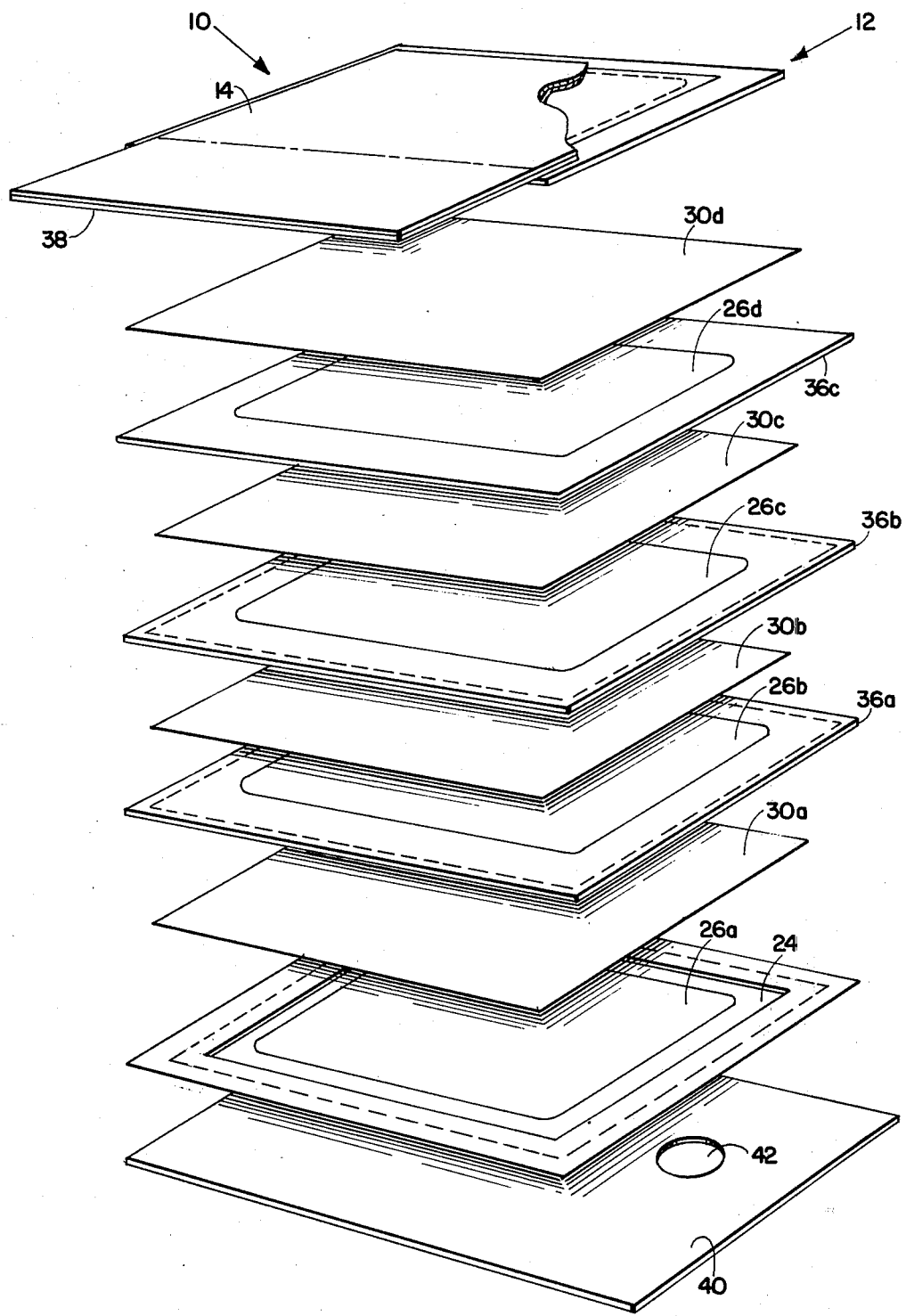
FIG. 3 is an exploded perspective representation of the components of a battery structure according to the invention, revealing the relative orientation of sheet-type components thereof.

Looking to FIGS. 2 and 3, the particular constructive features contributing to the improved characteristics of the battery are revealed in detail. Present as a LeClanche electrochemical system, battery 10 is formed having a cathode collector assembly depicted generally at 20. Prefabricated as a discrete element of the system, assembly 20 includes a lamination formed of a metallic sheet or foil current collector 22 which, in turn, is laminated to a polymeric current collector 24. Preferably, the metal current collector is provided as an annealed tin coated steel sheet and also may be formed of aluminum or lead sheet material on the order of less than 10 mils in thickness. The polymeric current collector 24 preferably is an electrically conductive carbon-impregnated vinyl film sold under the trade designation "Condulon" having a thickness on the order of about 2 mils. Serving also as an electrode active material support, collector sheets as at 24 generally are impervious to electrolyte, are electrochemically inert and are characterized in exhibiting a low resistance to the flow of current from one face to the opposite face thereof. The carbon-impregnated polymeric film materials will be seen to be utilized for important geometric definition within battery structures according to the invention as will become more apparent as the instant description unfolds.

Formed centrally on the inwardly facing side of collector sheet 24 is a distribution of positive active material 26a. For the embodiment illustrated, this material is in a "dry patch" configuration and, for the LeClanche system contemplated, is predeposited as a cathodic paste deposition formulated as a mixture of manganese dioxide and electrically conductive carbon particles dispersed, for example, in a polymeric binder. Following the initial deposition of the paste, the aqueous phase of the binder solution is removed, for instance, by heat-induced vaporization. Generally, a 25:1 ratio by weight of manganese dioxide to carbon is utilized for such dry-patch cathode structures where an actylene black is selected as the latter constituent. This ratio, depending upon the desires of the operator, generally is determined in view of the absorbancy or other qualities of the carbon selected. A variety of such patch-type cathode structures is described, for example, in U.S. Pat. No. 3,770,504. Additionally, a specifically preferred formulation is described in a copending application for U.S. Patent by Boyle et al, entitled "Flat Battery", Ser. No. 539,949, filed Jan. 10, 1975, now abandoned and assigned in common herewith.

Over cathode dry-patch 28a is deposited a conventional gel electrolyte or catholyte which may be present, for instance, as an aqueous solution of ammonium chloride and zinc chloride dispersed in a polymeric thicker such as hydroxyethylcellulose. The electrolyte may be deposited using conventional positive displacement techniques, doctoring, silk screening, extrusion or the like.

Over catholyte 28a and separating the cathode from the remaining components of the cell is a separator sheet material 30a. This material is selected as being wetable by that electrolyte with which it is in contact as well as being ionically permeable. Among the materials conventionally used as separators, mention may be made of cellulosic materials, woven or nonwoven, fibrous materials such as polyester, nylon, polypropylene, polyethylene or glass. Specifically, a Kraft paper having a thickness of about 3.0 mils has been found adequate for the instant application. Separator 30a is dimensioned having a peripheral shape and size assuring the electrical isolation of the electrodes of the cell within which it is located.

The anode electrochemically associated with cathode 26a also is of a "dry patch" configuration and is represented at 32a in association with an electrically conductive polymeric intercell connector 34a. Formed centrally on one side of intercell connector 34a, for a LeClanche electrochemical system, the deposition 32a may be provided by predepositing anode material in the form of powdered zinc dispersed in a binder matrix. For instance, the dry patch structure may be formed as described in the noted U.S. Pat. No. 3,770,504 or in the above-noted application for U.S. Patent, Ser. No. 539,949 and may be deposited as a mixture of powered zinc, a small amount of carbon black, an acrylic emulsion resin as well as binding agent in water. Following deposition, the paste is dried under conditions of elevated temperature. Intercell connector 34a is formed of a carbon impregnated polymeric sheet material, as described in connection with electrode support 24. Generally, the intercell connectors within the multicell format illustrated will have a thickness on the order of about 2 mils. Note that the intercell connector 34a is dimensioned in correspondence with sheet 24 and, more specifically, the periphery of the intercell connector extends substantially to the outer peripheral boundary of battery structure 10.

Similar to the battery structure described in the above-noted application for U.S. Patent, Ser. No. 536,379, the peripheral integrity of each cell structure within the multicell battery illustrated is provided by frame-shaped border seals, that utilized in conjunction with the instantly described cell being identified at 36a. Frame 36a as well as related frames 36b, 36c, and 36d of contiguous cells are formed having inner rectangular borders which define inner openings, the peripheries of which surround the cavities of an associated cell wherein electrochemical activity takes place. Additionally, each of the frames is dimensioned such that it extends beyond the peripheries of collector assembles 12 and 22 as well as slightly beyond intercell connectors 34a–34d. The frames are continuous and, preferably, are formed of a material which is thermally sealable in compatible fashion with the electrically conductive polymeric sheet materials of the battery structure. For instance, to provide an operating association with the noted "Condulon" materials, the frames may be formed of polyvinyl chloride having a thickness, for instance, of about 5 mils. In addition to the noted sealing compatibility, the material utilized for the frames should be electrolyte impervious, remaining inert to chemical activity of the battery structure.

A particularly important aspect of the instant invention lies in the relative dimensioning or geometry of frames as at 36a–36d with respect to the geometry and dimensioning of the polymeric sheet conductive materials, for instance, sheet 24 and intercell connectors 34a–34c. Note in FIG. 2 that the peripheries of these components extend substantially toward the peripheral end portions of corresponding frames 36a–36d. The dimensioning of frames 36a–36d is such that they extend beyond the edges of the polymeric electrically conductive sheets, however, the latter sheets or materials are arranged such that the edge or peripheral portions thereof are exposed to the atmosphere or external environment of battery 10. This arrangement is believed to substantially improve the outgassing performance of the battery to assure an adequate laminar geometry thereof over more extended shelf-life intervals.

As in the case of cathode material 26a and catholyte 28a, a suitable electrolyte or anolyte 28b is provided in conjunction with anode material 32a. As before, this electrolyte may utilize conventional ingredients, for instance, an aqueous solution of ammonium chloride and zinc chloride dispersed in a polymeric thicker such as hydroxyethylcellulose. In addition, a small quantity of mercuric chloride may be present in the electrolyte as a corrosion inhibitor. For simplicity, the electrolyte material utilized at 28a and 28b may be of the same origin.

To provide a multicellular pile structure, for instance, having four cells as illustrated in the drawings, the pile buildup essentially is continued utilizing the above-mentioned intercell connector units as at 34a–34c. These components are structured in identical fashion, each including an anode patch as at 32a–32c for respective intercell connectors 34a–34c and a cathode dry patch deposition 26b–26d deposited thereon opposite from the noted respective anode depositions. To simplify the description of the four cell buildup shown in the drawings, identical numeration is utilized in conjunction with a progressive alphabetical designation to identify identically structured components. For instance, electrically conductive polymeric electrode supporting sheets or intercell connectors 34b and 34c are structured identically as that described at 34a; separator elements 30b–30d are structured in identical fashion as separator 30a; and frames 36b and 36d are structured in identical fashion as frame 36a. Further, cathode materials 26b–26d are formed of similar materials and deposited in the same fashion as cathode 26a, while anode materials 32b–32d are formed and structured in identical fashion as anode material 32a.

Following the final electrolyte or anolyte deposition as at 28h (FIG. 2) the multicell subassembly is positioned to receive anode electrode current collector assembly 12. Assembly 12 is configured in somewhat similar laminar fashion as earlier described assembly 20. In this regard, assembly 12 is formed having a metallic sheet terminal surface portion preferably formed of annealed tin coated steel sheet material or foil on the order of less than 10 mils in thickness. Sheet 14 is laminated in electrical and physical bond with a polymeric current collector sheet of electrically conductive carbon impregnated polymeric material 38. Preferably, sheet 38 is formed on the earlier described "Condulon" material having a thickness on the order of about 2 mils. In lengthwise dimension, i.e. perpendicular to the section of FIG. 2, assembly 12 is of the same length as connector or electrode support sheets 24 and 34a–34d. However, the widthwise dimension of assembly 12 is extended to provide a wraparound terminal arrangement for the battery structure. An electrically insulative cardboard support having a hole or aperture formed therein at 42 is prepositioned over metallic sheet 22 as both a carrier and an insulator for the extended portion of assembly 12, which is wrapped about the battery to provide terminal surfaces in convenient adjacency at one side thereof.

For the battery embodiment described in connection with FIG. 2, frames 36a–36d preferably are preattached, as by thermal sealing, to respective intercell connectors or electrode support elements 34a–34c, as a preliminary step in fabrication. Note, however, that this preliminary sealing is carried out only within a limited but continuous region of the frames as identified at 16a in FIG. 2. Those portions of both the frames 36a–36d and corresponding intercell connectors 34a–34c extending beyond sealing region 16a initially are free of seals. During final sealing procedures, only those peripheral portions of frames 36a–36d and adjacent polymeric electrode support sheets 38, 22 and 34a–34c extending within region 16b are mutually intersealed to form the final battery seal. Such sealing inboard of the peripheries of the battery sheet components serves to improve the outgassing capability of each individual cell within battery unit 10, it being opined that such outgassing is permitted to take place, at least in part, through the carbon impregnated polymeric sheets.

Figure 4:
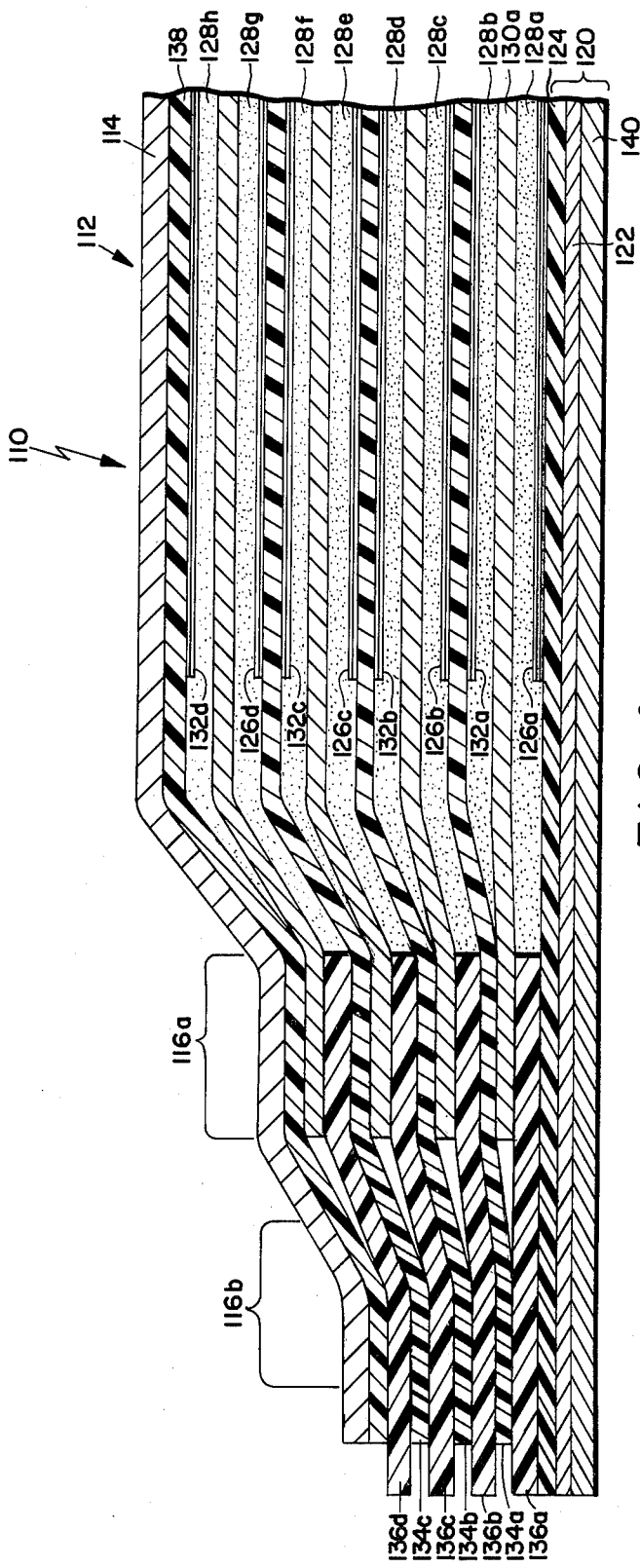
FIG. 4 is a partial sectional view of another embodiment of a battery structure according to the invention taken through the plane 4—4 of FIG. 1.

Turning now to FIG. 4, a preferred battery configuration according to the invention which also exhibits advantageous laminar stability through removal of electrochemically generated gases, as has been described in connection with the structure of FIG. 2, is revealed. Inasmuch as the structures shown in FIGS. 2 and 4 are somewhat similar, the components of FIG. 4 retain identical numeration with the structure of FIG. 2, however, the value 100 is added to each such numerical designation. Also present as a LeClanche electrochemical system, the battery, depicted generally at 110, is formed having a cathode collector assembly, shown at 120. Prefabricated as a discrete element of the system, assembly 120 includes a lamination formed of a metallic sheet current collector 122 which, in turn, is laminated to a polymeric current collector 124. As before, the metal current collector is provided as an annealed tin coated steel sheet, while the polymeric current collector 124, preferably, is an electrically conductive carbon-impregnated vinyl film sold under the trade designation "Condulon". Serving also as an electrode support, collector sheets as at 124 generally are impervious to electrolyte, are electrochemically inert and are characterized in exhibiting a low resistance to the flow of current from one face to the opposite face thereof. Over the polymeric current collector 124 is a patch of active positive material 126a predeposited as a cathodic paste deposition formulated as a mixture of manganese dioxide and electrically conductive carbon dispersed in a polymeric binder, as in the embodiment of FIG. 2.

Over the above-described assembly 120 and coextensive the surface of cathode material 126a is applied an electrolyte 128a which may be formulated as described above. In addition, a small quantity of mercuric chloride may be present in the electrolyte as a corrosion inhibitor.

Over collector assembly 120 and electrolyte deposition 128a is positioned a subassembly comprising a sheet of battery separator material 130a to which is prebonded a rectangular frame 136a, the inner border of which defines a rectangular inner opening configured for surrounding electrode depositions 126a and 132a. One surface adjacent the inner border of the frame is prebonded, preferably thermally, to the corresponding peripheral surface of separator sheet 130a. This subassembly, ultimately, is bonded, again preferably thermally, to adjacent and associated surfaces of thermally compatible polymeric sheets 124 and 130a only within the region designated 116b. Accordingly, each discrete cell within the multicell assembly advantageously is provided the earlier discussed venting facility available from the carbon-impregnated sheet components forming part of its structure. As in the embodiment of FIG. 2, frame 136a is dimensioned such that it extends beyond the periphery of polymeric collector 124 and intercell connector 134a to provide for the assured electrical isolation of the peripheries of these electrically conductive components. As in the earlier embodiment, frame 136a is continuous; is formed of a compatible material heat sealable both with itself and the material of the electrically conductive polymeric materials; and is electrolyte impervious, remaining inert to the chemical activity of the battery structure. The separator material 130a for the noted cell is characterized in being aqueous electrolyte permeable and electrically insulative. The material may be present as a Kraft paper having a thickness, for structures similar to that described in connection with FIG. 2, of about 2.5 mils.

As is apparent from the figure, the intercell connector is not preassembled with a frame-type seal as in the embodiment of FIGS. 2 and 3. However, in similar fashion to the embodiment of FIG. 2, the intercell connector is prefabricated to comprise a sheet of electrically conductive polymeric material 134a which is configured having the identical shape as corresponding polymeric collector sheet 124. Similarly, preformed centrally upon the lower side of sheet 134a is a distribution of active zinc negative or anode material 132a which, in conventional fashion, is amalgamated with, for instance, mercury by contact with mercuric chloride within the electrolyte of the cell. Oppositely disposed upon sheet 134a is another dry deposition of active positive material 126b which, as before, is present as a manganese dioxide/electrically conductive carbon mixture dispersed in a polymeric binder. Intermediate active material 132a and separator 130a is an additional coating of electrolyte 128b.

When sheet 134a, incorporating the noded electrode materials, is positioned as shown in registry over separator 138a –frame 136a the components of the initial electrochemically active cell are substantially operationally located. The sealing arrangement provided by the combined continuous frame and separator ultimately effects a geometry of components wherein the electrode active materials of opposite polar sense are fully segregated at either side of the separator. Such segregation, for instance, is essential where the earlier described slurry electrode battery systems are contemplated. In final sealing of a multicellular structure, thermal seals additionally are effected between the upward surface of polymeric current collector sheet 124 and the adjacent face of frame 126a only within region 116b, as well as between the opposite surface of the frame and the lower surface of intercell connector 134a, again, only within region 116.

A multicellular pile structure having four cells, as illustrated in the drawings, is provided by continuing the build-up technique utilizing additional identical intercell connector elements which additionally serve as polymeric collector sheets and are depicted at 134b and 134c. As in the case of FIGS. 2 and 3, identical numeration is utilized in conjunction with a progressive alphabetical designation to identify identical components of the multicell structure.

Following final electrolyte deposition 128h, the multicell assembly receives anode electrode current collector assembly 112. This assembly is configured in identical manner as that described at 12 in connection with FIG. 2. An electrically insulative cardboard support 140 may be positioned beneath metal laminate 122 for selective terminal surface designation as well as to accommodate for the mutual isolation of the folded portion of collector assembly 112 as it is wrapped around the compiled battery to provide a terminal defining surface adjacent to surface 122. An aperture 142 is provided in card 140 for the noted terminal surface designation.

While exhibiting a slightly different geometrical laminar structure due to the utilization of a preassembled subassembly comprising separator sheets 130a–130d in combination with the peripheral frames 134a–134d, the embodiment shown at 110 still provides for the outgassing of individual cells within the multicell structure by the selective exposure of carbon-impregnated polymeric materials to the environment external to the battery.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A planar battery comprising: at least two discrete, sheet-type electrically conductive electrode supports substantially permeable to volatile effluvia generated internally of said battery;

separator means, electrode active material and electrolyte configured and arranged between said electrode supports to define at least one cell within said battery;

means defining a seal about the peripheral portion of said cell, said seal being formed inwardly of peripheries of said electrode supports to expose a portion thereof to the external environment of said battery in which said means defining said seal includes an electrically insulative frame having an opening defined by an inner border, an outer periphery and surface sealing portions intermediate said inner border and outer periphery, and in which said electrically insulative frame outer periphery extends outwardly beyond the periphery of said electrode supports.

2. The planar battery of claim 1 in which;
   said conductive electrode supports are formed of carbon impregnated polyvinyl chloride sheet; and
   said insulative frame is heat sealed thereto only along said surface sealing portions.

3. The planar battery of claim 1 in which said separator means is formed of electrolyte permeable sheet material configured having a periphery extending over said frame inner opening and remaining inwardly of said surface sealing portions.

4. The planar battery of claim 3 in which said separator means is bonded to said frame along a surface thereof situate between said inner border and said sealing portions.

5. The planar battery of claim 3 in which said electrode active material includes zinc anode material, and manganese dioxide and carbon cathode material.

6. The planar battery of claim 3 in which said electrode supports and said frames are formed of materials mutually compatible to effecting a thermally induced bond therebetween.

7. In a planar battery of a variety including carbon impregnated polymeric sheet electrode supports, sheet separator means, electrode active materials and electrolyte adjacent over said electrode supports, said electrode active materials being mutually separated in electrically insulative fashion by said sheet separator means, and a peripherally disposed seal component; the improvement wherein said seal is formed in attachment with mutually spaced ones of said electrode supports inwardly of the peripheries thereof so as to permit venting to the atmosphere of cells of said battery, wherein said seal includes an electrically insulated frame having an opening defined by an inner border, and an outer periphery; said attachment being effected at surface regions thereof intermediate said inner border and outer periphery, and in which said electrically insulative frame outer periphery extends outwardly beyond the periphery of said electrode supports.

8. The planar battery of claim 7 wherein said frame is formed of polyvinyl chloride.

9. The planar battery of claim 7 in which said separator means is formed of electrolyte permeable sheet material configured having a periphery extending over said frame inner opening and remaining inwardly of said surface sealing portions.

10. The planar battery of claim 8 wherein said sheet electrode supports are formed of carbon impregnated polyvinyl chloride.

11. The planar battery of claim 9 in which said separator means is bonded to said frame along a surface thereof situate between said inner border and said sealing portions.

12. The planar battery of claim 9 in which said electrode active material includes zinc anode material, and manganese dioxide and carbon cathode material.

13. The planar battery of claim 9 in which said electrode supports and said frames are formed of materials mutually compatible to effecting a thermally induced bond therebetween.

* * * * *